United States Patent Office 3,331,080
Patented July 11, 1967

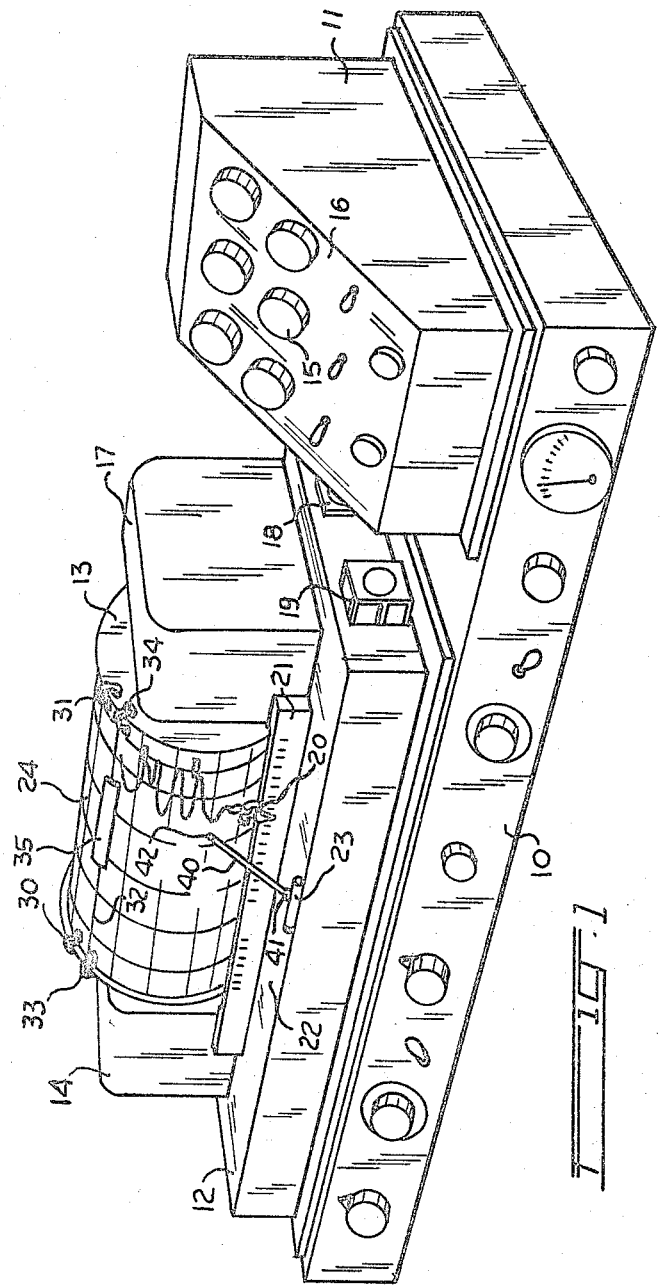

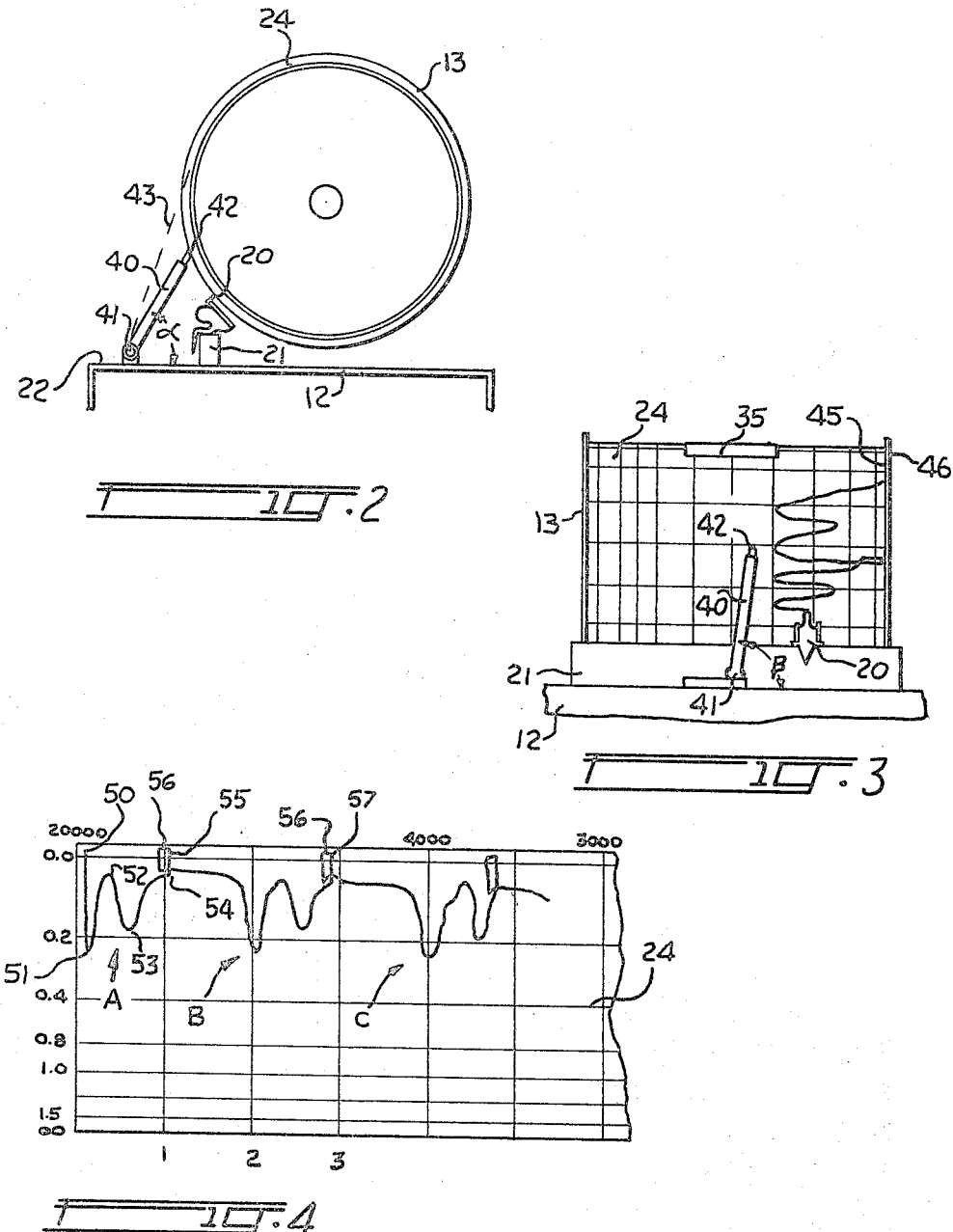

3,331,080
MEANS FOR AUTOMATICALLY ADJUSTING THE POSITION OF SHEET CHARTS ON REVERSIBLE RECORDER DRUMS
John H. Ellis, Georgetown, Ky., assignor, by mesne assignments, to The University of Kentucky Research Foundation, Lexington, Ky., a corporation of Kentucky
Filed Oct. 22, 1965, Ser. No. 501,095
4 Claims. (Cl. 346—125)

ABSTRACT OF THE DISCLOSURE

A reversible recorder drum enveloped by a sheet chart in non-fixed relation thereto and receiving a pen trace during rotation of the drum on its axis. Means mounted on a stationary part of the apparatus and bearing against the exposed surface of the chart permits the chart to travel with the drum during its rotation in one direction and holds the chart against movement during drum travel in the opposite direction to provide a pen trace on the chart having successive readings distinguishable from each other and without manual adjustment of the chart between successive pen traces.

---

This invention relates to the recording of data on sheet charts, and more particularly to a means for automatically adjusting the position of such charts on reversible recorder drums.

For purposes of illustration the invention is disclosed in relation to a conventional infra-red spectrophotometer apparatus although in its broader aspects it is equally well adapted to other forms of apparatus employing sheet charts on reversible recorder drums. When such apparatus is used for routine quantitative analysis in which many samples are to be presented seriatim for scanning in a pre-selected portion of the spectrum, some arrangement, either of a manual or automatic nature, must be provided to adjust the chart so that the pen trace for one sample will not be superimposed upon the traces for other samples. One such arrangement comprises a slave recorder for adjusting the chart position, but this has the disadvantage of adding substantially to cost of the apparatus and requiring a certain amount of additional maintenance and observation. More commonly, the reversible drum means is provided with a clutch so that chart adjustment can be made in the following manner. For example, the operator is expected to clamp the chart to the drum in fixed relation thereto and to conduct the analysis of the first sample. As this analysis is finished the servo-motor circuits for moving the pen produces a signal which causes the pen to rapidly drive off the scale of the chart as the drum is reversed. Thereafter, the drum comes to rest and the operator then has to de-clutch the drum, rotate the drum so that the trace later to be made by the pen in the analysis of the next sample will not interfere with the trace already made, re-clutch the drum, position the next sample in the apparatus, and then close the switch which starts the forward movement of the chart as thus readjusted. Such a procedure is required for each subsequent sample, and requires not only a substantial expenditure of time but also a careful manipulation on the part of the operator.

It is these and other disadvantages of the conventional practices and forms of apparatus which it is a purpose of the present invention to overcome.

An object of the invention is to provide a simple means for automatically adjusting the position of sheet charts on reversible recorder drums.

Another object is to provide an adapter in the form of a chart snubbing mechanism which may readily be added to or removed from the frame of a reversible drum recording apparatus.

A further object is to provide an apparatus for reducing the work required of an operator engaged in routine quantitative analysis using spectrophotometers and like apparatus having reversible recorder drums.

These and other objects and advantages of the invention will become more apparent as the description proceeds and when considered in conjunction with the accompanying drawing in which FIG. 1 is a perspective view of a spectrophotometer apparatus embodying the invention.

FIG. 2 is a diagrammatic view indicating the relationship of the drum, pen and snubbing means in end elevation.

FIG. 3 is a diagrammatic view indicating the relationship of the drum, pen and snubbing means in front elevation; and FIG. 4 is a plan view of a chart showing pen traces for successive samples and taken in accordance with the practice of the invention.

By way of illustration and not of limitation, the apparatus seen in FIG. 1 and which represents the Model 21 Double Beam Recording Infra-red Spectrophotometer available from Perkin-Elmer Corporation, Norwalk, Connecticut, may conveniently be equipped with the automatic chart adjusting means of the present invention thus to make possible the accomplishment of the above-enumerated objectives. Such an apparatus includes an elongated base structure 10 upon which is mounted adjacent one end a light source housing 11. Spaced from the source housing is the main spectrometer housing including a stationary frame 12 upon which the cylindrical recorder drum 13 is mounted for rotation about its axis. Conventional means (not shown) is mounted within an end housing 14 for driving the drum in a selected forward or reverse direction under control of a scanning switch 15 which is mounted in an accessible position on the control panel 16 which forms the cover for housing 11. The photometer section is enclosed by another end housing 17 in conjunction with frame 12, and the frame is provided with a pair of apertures confronting the light source housing and through which the reference and the sample beams of light are directed after passing through the respective reference and sample holders 18 and 19.

A conventional pen assembly 20 is adapted for reciprocatory movement along the top edge of an upstanding plate 21 adjacent the cylindrical surface of drum 13, and between this plate and the front edge of the frame 12 a flat shelf 22 is provided and upon which the base 23 of the snubbing means later to be described is detachably mounted. As will be understood, the drum turns upwardly in front during its forward movement and conversely turns downwardly during its reverse or re-cycling movement. However, in each of these movements the pen normally remains in contact with the sheet chart 24 which envelops that drum. In the absence of means for adjusting the chart upon the drum, all recordings made with the apparatus operating with its scanning control in the recycle position and repeatedly scanning a preselected portion of the spectrum would result in the pen traces falling in the same areas of the chart. Although this situation may not be undesirable, and indeed may be useful, when kinetic studies are being made with samples in which a slow reaction is taking place, nevertheless, if samples were being changed each time the scan is reversed, a given recording could not be identified with respect to a particular sample.

In accordance with this invention, a sequenced chart presentation of the pen traces for the respective samples can be obtained without manually resetting the chart between samples, and merely by having that chart in non-fixed relation to the drum and snubbed against reverse rotation with the drum. As an example, preparatory to operating the apparatus a chart 24 is detachably clamped at its sides to the drum by means of conventional clamps 30, 31 and is firmly wound about the drum until its edge 32 overlaps the corresponding edge of the chart. It then is held in clamped position by additional clamps 33, 34 until an adhesive fastening strip 35 is placed over the junction of the chart surfaces, after which all of the clamps are released. The degree of tautness of the chart material during this installation on the drum is determined by experience and may vary. However, in any event, the underside of the chart is in frictional contact with the entire cylindrical surface of the drum and the chart is free to slip with respect to the moving drum when subjected to a predetermined amount of force.

Various devices may be employed to produce this force. As shown in FIGS. 1 to 3, a preferred form of device comprises a rigid arm 40 pivotally mounted at its lower end in an adjustable joint 41 affixed to the base 23 which in turn is detachably affixed to the shelf 22 adjacent the mid-plane between the ends of drum 13. At its upper end the arm 40 mounts a suitable resilient snubbing head 42 which remains in contact with the surface of chart 24, and which may comprise a rubber material.

As best seen in FIG. 3, the plane normal to the axis of the drum and in which contact between the chart and the snubbing head occurs is located generally near the center of the chart and preferably intersects the fastening means 35.

The length of arm 40 depends upon the diameter of the drum as well as upon the point at which the lower end of the arm is mounted. In any event, and as best seen in FIG. 2, the contact of the snubbing head with the chart is above the line of contact which pen 20 makes with that chart and below the point at which a straight line indicated at 43 and extending from joint 41 would be tangential to the chart as the chart recedes from the snubbing means. For example, an acute angle α between the axis of arm 40 and the plane of shelf 22, approximating 55°, in the plane normal to the axis of the drum, is generally satisfactory.

Best results can be obtained when the edge 45 of the chart adjacent the beginning and the stopping positions of the pen movement is constantly urged into contact with the flange 46 of drum 13 during movement of the drum. This may be accomplished by establishing a component of force resulting from the inclining of the axis of the arm 40 toward flange 46 and away from the plane normal to the axis of the drum and passing through the joint 41. For example, an acute angle β between the axis of the arm and the plane of shelf 22, approximating 85°, is generally satisfactory.

With the foregoing in mind, reference now is made to FIG. 4 and to a typical operation conducted by an operator of the improved apparatus. With the initial sample in place in holder 19 and with the machine adjusted for the particular spectrum to be repeatedly scanned, the drum starts its forward movement. As this occurs and assuming that, for example, the materials being analyzed provides a trace as illustrated herein, pen 20 effects the trace of a typical sample A beginning at point 50 off the chart scale and moving thence to peak 51, valley 52, peak 53, and to finish 54. At this finish point the drum begins its reverse movement and the pen moves quickly to point 55 off the scale. During forward movement the frictional contact between snubbing head 42 and the chart is negligible and the drum accordingly carries the sheet chart with it while the pen is accomplishing the thus described trace. When, however, the drum starts to reverse, the frictional contact of the snubbing head comes into play and after a slight reverse movement the sheet chart comes to rest as the drum rotates in its reverse movement therebeneath. This slight movement is reflected by the short pen trace 56 which occurs off the chart scale. During this automatic reversal of the drum movement, the operator has time to change the sample in the holder 19 since he is in no way concerned with making any adjustment of the chart position. Thereafter, with sample B in place in the holder 19 the drum again starts its forward rotation, the pen effects the trace and as the drum later reverses, the pen moves to point 57 off the scale. Samples C and subsequent samples are measured in a similar fashion.

When the desired number of samples have been analyzed the chart is then removed from the drum, and templates or other means may be placed on the chart to identify the characteristic points of the recorded spectra.

By thus relieving the operator from making chart adjustments between successive samples the work output may be significantly increased. Merely as an example, in the analysis of pesticide samples for aldrin content it has been found that thirty readings per hour may be secured when using the present apparatus in contrast with about ten readings per hour when manual adjustment of the chart is required under conventional practices.

The snubbing device may easily be removed from the apparatus when a different pattern of measurements are to be taken and thereafter the chart may be held upon the drum by the conventional clamps 30, 31, 33 and 34.

Having thus described the invention and its attendant advantages, it is intended that the appended claims are to cover such changes and modifications of the described invention as come within the true spirit and scope of the same.

What is claimed is:

1. In a spectrophotometer or the like having a cylindrical recording drum, a stationary frame supporting said drum for rotation about its axis, and means for selectively rotating said drum in a forward direction and in a rearward direction, the improvement comprising, a sheet chart in frictional contact with the entire cylindrical side of said drum and in non-fixed relation thereto, a recording pen adapted to remain in contact with said chart during both forward and reverse rotation of said drum, and chart-adjusting means attached to said frame and bearing against said chart during rotation of said drum in each direction, said chart-adjusting means permitting travel of said chart with said drum during rotation of said drum in a forward direction and preventing substantial travel of said chart with said drum during rotation of said drum in a reverse direction, said chart-adjusting means being in contact with said chart at a point above the line of contact of said pen and chart and below the point at which a straight line from the mounting position of said means on said frame would be tangential to the surface of said chart as it recedes from said chart-adjusting means during forward movement of said drum.

2. Apparatus as defined in claim 1 wherein said chart-adjusting means is in contact with said chart along a line generally midway between the side edges of said chart.

3. In a spectrophotometer or the like having a cylindrical recording drum, a stationary frame supporting said drum for rotation about its axis, and means for selectively rotating said drum in a forward direction and in a rearward direction, the improvement comprising, a sheet chart in frictional contact with the entire cylindrical side of said drum and in non-fixed relation thereto, a recording pen adapted to remain in contact with said chart during both forward and reverse rotation of said drum, said chart having one side edge adjacent which said pen rests when said drum is at rest, and chart-adjusting means comprising an arm attached to said frame intermediate the planes of the ends of said drum and having at one end a resilient head in frictional contact with said chart during rotation of said drum in each direction, said chart-adjusting means permitting travel of said chart with said drum during rotation of said drum in a forward direction and preventing substantial travel of said chart with said drum during rotation of said drum in a reverse direction, and an adjustable joint connecting the other end of said arm to said frame, said head being in contact with said chart at a point above the line of contact of said pen and chart and below the point at which a straight line from said joint would be tangential to the surface of said chart as it recedes from said head during forward movement of said drum.

4. Apparatus as defined in claim 3 wherein the axis of said arm is inclined toward said one side edge of said chart.

References Cited

FOREIGN PATENTS 688,881  3/1953  Great Britain.

RICHARD B. WILKINSON, *Primary Examiner.*

MICHAEL L. LORCH, *Assistant Examiner.*